United States Patent Office 3,453,277
Patented July 1, 1969

---

3,453,277
NOVEL NITROGEN-CONTAINING HETEROCYCLIC COMPOUNDS
Henri Ramuz, Birsfelden, and Hans Spiegelberg, Basel, Switzerland, and Werner Abele, Oberlar, Germany, and Alfred Dornow, deceased, late of Hannover, Germany, by Gerda Dornow, Hartmut Dornow and Volker Dornow, heirs, Hannover, Germany, assignors to Hoffmann-La Roche Inc., Nutley, N.J., a corporation of New Jersey
No Drawing. Filed Apr. 1, 1966, Ser. No. 539,580
Claims priority, application Switzerland, Apr. 15, 1965, 5,293/65
Int. Cl. C07d 57/00, 51/04; A61k 27/00
U.S. Cl. 260—250
10 Claims

ABSTRACT OF THE DISCLOSURE

A compound of the formula

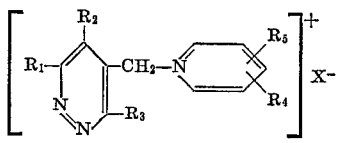

wherein $R_1$ and $R_2$ can be hydrogen or lower alkyl; $R_3$ is hydrogen, halogen, amino or lower alkoxy; $R_4$ and $R_5$ can be hydrogen, lower alkyl, hydroxy lower alkyl, lower alkanoyl, lower alkyl substituted benzoyl, halo benzoyl, benzoyl or, taken together, $R_4$ and $R_5$ together with the pyridine moiety represent a fused ring, e.g., quinoline; X represents the anionic moiety of a nontoxic acid. The compounds are useful as coccidiostats.

---

This application relates to novel nitrogen-containing heterocyclic compounds, their preparation and use. More particularly, this application in its product aspect relates to novel pyridazine compounds for the formula

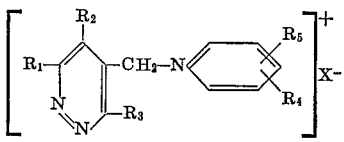

wherein $R_1$ and $R_2$ are each independently selected from the group consisting of hydrogen and lower alkyl; $R_3$ represents hydrogen, halogen, amino or lower alkoxy; $R_4$ and $R_5$ are each independently selected from the group consisting of hydrogen, lower alkyl, hydroxy lower alkyl, lower alkanoyl, benzoyl and substituted benzoyl or taken together $R_4$ and $R_5$ together with the pyridyl moiety represent a fused ring or a lower alkyl substituted fused ring and X represents the anionic moiety of a non-toxic acid.

The term "lower alkyl" as used herein denotes a straight or branched chain saturated hydrocarbon such as, for example, methyl, ethyl, propyl, isopropyl, butyl and the like. The term "lower alkoxy" represents lower alkylether groups such as methoxy, ethoxy, propoxy, isopropoxy and the like. The terms "halo," "halide" and "halogen" represent all four halogens, i.e., iodine, bromine, chlorine and fluorine with iodine, bromine and chlorine being preferred. The term "lower alkanoyl" represents the acyl moiety of a lower alkyl carboxylic acid. The term "substituted benzoyl" represents a benzoyl group in which one or more of the hydrogen atoms has been replaced by a functional group such as halo, lower alkyl, etc., preferably halo and preferably in the p-position. When $R_4$ and $R_5$ in Formula I above are taken together with the pyridyl moiety to which they are attached so as to form a fused ring or lower alkyl substituted fused ring, they represent, together with the pyridyl portion, such groups as, for example, quinolyl, isoquinolyl, 5,6,7,8-tetrahydroquinolyl, 5,6,7,8-tetrahydroisoquinolyl group or such groups bearing one or more lower alkyl substituents.

Compounds within the scope of Formula I which are of particular interest are those in which $R_1$ and $R_2$ represent hydrogen or lower alkyl of up to 4 carbon atoms preferably methyl or propyl; $R_3$ represents a halogen atom preferably chlorine; and $R_4$ and $R_5$ represent hydrogen or lower alkyl of up to 4 carbon atoms preferably methyl and ethyl or a lower hydroxylalkyl of up to 4 carbon atoms particularly hydroxymethyl or hydroxyethyl or a lower alkanoyl having up to 4 carbon atoms preferably acetyl. As representatives of the heterocyclic nitrogen-containing groups which are bound via the methylene bridge with the pyridazine nucleus in Formula I, there can be named, for example, pyridyl, 2-methylpyridyl, 4-methylpyridyl, 4-acetylpyridyl, 4-benzoylpridyl, 3-(4'-chlorobenzoyl)pyridyl, 2-hydroxymethylpyridyl, 4-methoxypyridyl, qinolyl, isoqinolyl, 5,6,7,8-tetrahydroisoquinolyl, etc. Preferred pyridazine compounds of Formula I prepared in accordance with this invention are:

1-[(6-chloro-3-methyl-pyridazinyl-(5))-methyl]-2-picolinium chloride
1-[(6-chloro-3,4-dimethyl-pyridazinyl-(5))-methyl]-pyridium chloride
1-[(6-chloro-3,4-dimethyl-pyridazinyl-(5))-methyl]-2-picolinium chloride
1-[(6-chloro-3,4-dimethyl-pyridazinyl-(5))-methyl]-4-acetylpyridinium iodide
1-[(6-chloro-3,4-dimethyl-pyridazinyl-(5))-methyl]-5,6,7,8-tetrahydroisoquinolinium chloride.

According to the process aspect of this invention a pyridazine of the formula

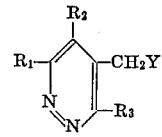

in which $R_1$, $R_2$ and $R_3$ have the same significance as above and Y represents halogen or lower alkoxy, is condensed with a heterocyclic nitrogen-containing compound of the formula

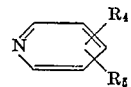

in which $R_4$ and $R_5$ have the same significance as above, or with a salt thereof. The salt obtained can, if desired, be converted into another salt, preferably a pharmacautically acceptable salt.

The compound of Formula II can, insofar as Y signifies halogen, be directly condensed as the halide with the heterocyclic nitrogen-containing compound present as the free base. If Y signifies an alkoxy group, the condensation is conveniently carried out with an acid addition salt of the pyridine compound.

The pyridazine component is preferably condensed with the heterocyclic nitrogen-containing compound in the presence of an inert solvent such as acetonitrile, nitromethane, dimethylformamide and the like, preferably at an elevated temperature, e.g., at a temperature of about 20-120°. The condensation can also be carried out in a solvent-free medium in an excess of the heterocyclic nitrogen-containing reactant.

The salts obtained in the reaction can be converted into other salts by known processes for exchanging anions, e.g., by ion exchange. Preferred salts are those with both pharmaceutically acceptable inorganic and organic acids, such as, hydrohalic acids, e.g. hydrogen chloride, hydrogen bromide, hydrogen iodide, as well as other mineral acids; e.g. sulfonic acid, phosphoric acid, nitric acid and with organic acids, e.g. tartaric acid, citric acid, oxalic acid, camphorsulfonic acid, ethanesulfonic acid, toluenesulfonic acid, salicylic acid, ascorbic acid, maleic acid, mandelic acid, and the like.

The pyridazine intermediates of Formula III can be prepared by several alternative procedures. They can, for example, be prepared according to either of the reaction schemes outlined in schematic diagrams A and B below.

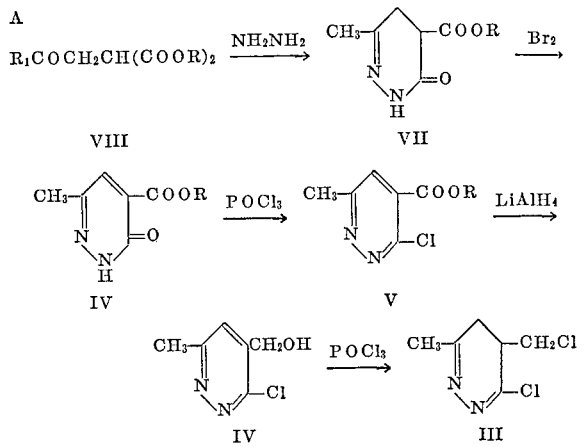

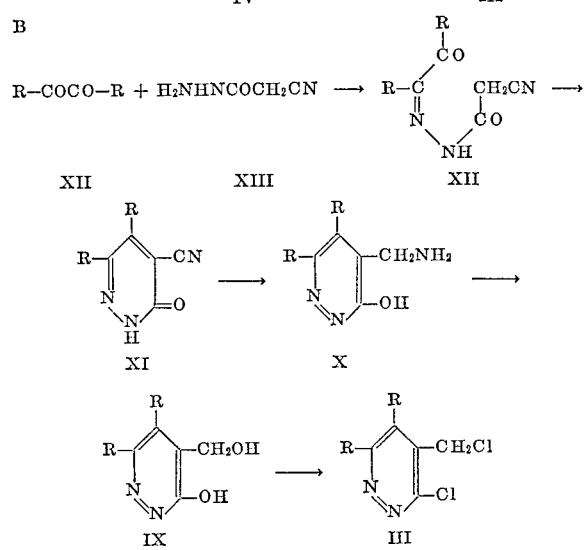

wherein R in each of the formulas above represents lower alkyl and $R_1$ represents hydrogen or lower alkyl.

The intermediates of Formulas III, IV, V, IX and X can be represented by the general Formula XV

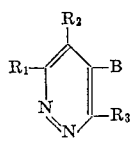

wherein $R_1$ and $R_2$ are each independently selected from the group consisting of hydrogen and lower alkyl. $R_3$ is hydrogen, halogen amino or lower alkoxy, and B is aminomethyl, hydroxymethyl, halomethyl, lower alkoxy methyl, or carbo-lower alkoxy, i.e., a —COOR group wherein R is lower alkyl.

The intermediates represented by Formula XV above are also novel compounds and thus constitute part of this invention.

The novel pyridazine compounds obtained in accordance with this invention exhibit a good solubility in water and are active against coccidiosis, a very widespread poultry disease which occurs in the form of severe intestinal infections often fatal. Coccidiosis is ascribed to infection by various protozoa of the genus Eimeria such as, for example, *Eimeria tenella*. The control of this disease is accordingly economically significant for poultry breeders and egg producers. The novel pyridazine compounds are therefore useful for the prevention, control and cure of coccidiosis. They can be administered to the poultry (e.g. hens or turkey cocks) together with inert carrier materials, the normal food or the drinking water in prophylactically or therapeutically active quantities. Moreover, the novel pyridazine compounds exert a growth-promoting action on the poultry and therefore they are useful as growth-promoting agents.

In order to bring the novel pyridazine compounds into a form which is suitable for administration to the poultry, one or more of these compounds can be incorporated in homogeneous and finely divided form into a liquid or powdery feed, a feed mix or other animal food product or dissolved in the drinking water. Any suitable commercial animal- or poultry-feed product can be used as the feed product. The doses of the novel active materials necessary for the prophylactic and curative treatment of coccidiosis normally lie between about 0.0025 and 0.05% of the weight of the ready-to-use feed, drinking water or other liquid. In special cases, however, it can be convenient to use concentrations which are smaller or larger than the limiting values named above. A homogeneous distribution of the active material may be easily brought about according to the usual methods by mixing, grinding, stirring or spraying dilute solutions of the active material (preferably in water) on the carrier material or the feed.

The active materials can also be brought into the form of premixes for dilution with the basic feed. The products to be used as premixes can contain the active substance in concentrations of about 5–95 wt. percent and preferably from about 10–25 wt. percent. As carrier materials for these premixes there can, for example, be used dried grain, side-products of the milling industry, ground oil cake, distillation residues of the fermentation industry, finely divided mineral materials such as bentonite, diatomaceous earth, ground oyster shells and silicon dioxide. Other excipients such as fats, oils, antioxidants and surface-active materials can also be incorporated into the premixes.

When administered to the poultry as an ingredient of the normal poultry food, the novel coccidiostatically active pyridazine compounds cause in birds which are already infected a decline or complete healing of the infection, while simultaneously producing a high increase in weight of the birds. With this treatment, satisfactory cure results are normally achieved with a quantity of 0.01–0.025% of the pyridazine compound based on the weight of the feed or drinking water. However, in cases of severe infection the concentration can be increased up to about 0.05% based on the weight of the feed or drinking water.

In order to effectively prevent the occurrence of coccidiosis in poultry, the novel pyridazine compounds are advantageously administered in prophylactic quantities of about 0.0025–0.02% based on the weight of the feed or drinking water.

Even very small quantities of only about 0.0025% of the pyridazine compounds, based on the weight of the feed, evoke a marked growth-promoting action in the poultry. The growth-promoting concentration normally lies in the range of about 0.0025–0.02% of the weight of the feed.

The invention can be more readily understood from the specific examples which follow. These examples are illustrative of the invention and are not to be construed as limitative thereof. All temperatures are in degrees centigrade.

EXAMPLE 1

0.536 g. of 6-chloro-5-chloromethyl-3-methyl-pyridazine and 2 ml. of 2-methyl-pyridine was heated to 90°

C. Colorless crystals soon precipitated and the condensation was ended after 6 hours. The excess 2-methylpyridine was distilled off under reduced pressure. The 1-{[6-chloro-3-methyl - pyridazinyl - (5)] - methyl}-2-picolinium chloride which remained behind was dissolved in absolute ethanol and precipitated with ether. The compound melted at 202–204° C. (dec.).

The 6-chloro-5-chloromethyl-3-methyl-pyridazine employed as starting material was prepared as follows:

20 g. of 3-methyl-pyridazone-(6)-(carboxylic acid)-(5) ethyl ester was warmed to 70–80° C. for 4 hours in 100 ml. of phosphorous oxychloride to which a few drops of water had been added. The excess phosphorous oxychloride was subsequently distilled off under reduced pressure. The residue was thoroughly stirred with ice-water and sodium carbonate and extracted with ether. The ether extract was dried over sodium sulphate and concentrated under reduced pressure. The oily, brown-colored 6-chloro-3-methyl-pyridazine-(carboxylic acid)-(5) ethyl ester which remained behind formed compact colorless crystals which melted at 41° C. after recrystallization from petroleum ether.

25 g. of 6-chloro-3-methyl-pyridazine-(carboxylic acid)-(5) ethyl ester was dissolved in 250 ml. of absolute ether and was added dropwise simultaneously with 125 ml. of a 1 molar ethereal lithium aluminum chloride solution into 100 ml. of ether at −35° C. with stirring during the course of 2 hours. After complete addition, the reaction mixture was stirred for an additional 2 hours and subsequently left to stand in the cold for 13 hours. The alanate complex was decomposed by the addition of moist ether. The reaction mixture was gradually warmed to room temperature. The crude 6-chloro-3-methyl-5-hydroxymethyl-pyridazine which precipitated was isolated, dried and extracted with ether in a Soxhlet apparatus. The product obtained from the ether extract melted at 180° C. after recrystallization from ethanol.

2 g. of 6-chloro-3-methyl-5-hydroxymethyl-pyridazine was warmed at 70° C. for 3 hours in 20 ml. of phosphorous oxychloride and a few drops of water. The excess phosphorous oxychloride was distilled off under reduced pressure. The residue was thoroughly stirred with ice-water and sodium carbonate and extracted with ether. The ether extract was dried over sodium sulphate and evaporated under reduced pressure. The 6-chloro-5-chloromethyl-3-methyl-pyridazine which remained behind, after recrystallization from petroleum ether, precipitated as colorless needles which melted at 86° C.

6-chloro-5-chloromethyl-3-pyridazine was also prepared by an alternative process as follows:

32 g. of hydrazine (anhydrous) was dissolved in 200 ml. of isopropanol and cooled to 0° C. A solution of 169 g. of acetonyl-cyano-acetic acid ethyl ester was slowly added dropwise (at a temperature of about −1°). Upon completion of the dropwise addition the mixture was warmed to room temperature. The oily precipitate which formed initially, gradually became crystalline. The mixture was stirred at room temperature for 1 hour. The precipitate was filtered off with suction and washed with a small amount of isopropanol and petroleum ether. There was thus obtained 5-cyano-3-methyl-1H-4,5-dihydropyridazin-6-one of melting point 97–100° suitable for use in the next step.

46.4 g. of 5-cyano-3-methyl-1H-4,5-dihydropyridazin-6-one was dissolved in 900 ml. of glacial acetic acid and a solution of 17.3 ml. bromine in 360 ml. of glacial acetic acid was added dropwise. The temperature climbed from 24° to 30°. After 2 hours the reaction mixture was evaporated to dryness and the residue suspended in 800 ml. of water. The pH was adjusted to 5 and the mixture extracted with sodium bicarbonate and ethyl acetate. The ethyl acetate solution was treated with charcoal, filtered, dried over sodium sulfate and evaporated to dryness in vacuo. The yellow crystalline precipitate was dissolved in 700 ml. of methanol and hydrogenated with 180 ml. of 1 N HCl and 1.5 g. of palladium/carbon. After about 2 hours, the hydrogenation was completed. The catalyst was filtered and the solution concentrated by evaporation. The 5-aminomethyl-3-methylpyridazin-6-one hydrochloride produce crystallized from 90 percent methanol melted at 273° with decomposition.

10.54 g. of 5-aminomethyl-3-methylpyridazin-6-one hydrochloride was dissolved in 300 ml. of water and 5.2 ml. of glacial acetic acid and cooled to 0°. A solution of 4.14 g. sodium nitrite in 100 ml. of water was added dropwise. The temperature remained between 2° and 4°. The mixture was then warmed to 20° and heated for 2 minutes to 98° and then evaporated to dryness in vacuo. The crystalline residue was thoroughly dried in a desiccator over phosphorous pentoxide. 25 g. phosphorous pentachloride in 250 ml. phosphorous oxychloride was added thereto and heated for 2 hours at 75° under stirring. The mixture was then evaporated in vacuo, treated twice with absolute benzene and concentrated by evaporation. 300 g. of ice was added and the pH adjusted with sodium carbonate to 5. The solution was extracted with ether and the ether solution was treated with Norit, the carbon filtered off and the filtrate dried over sodium sulfate and subsequently evaporated in vacuo. The 6-chloro-5-chloromethyl-3-methylpyridazine, after crystallization from isopropyl ether, melted at 90–91° with decomposition.

EXAMPLE 2

6.0 g. of 6-chloro-5-chloromethyl-3-methylpyridazine was added to 24 ml. of 5,6,7,8-tetrahydroisoquinoline and the mixture heated for 6 hours at 90°. Upon cooling and addition of ether, a crystalline precipitate separated out which was recrystallized from isopropanol. The 1-{[6-chloro-3-methyl-pyridazinyl-(5)]methyl} - 5,6,7,8 - tetrahydroisoquinolinium chloride product so obtained melted at 218° with decomposition.

EXAMPLE 3

1.91 g. of 6-chloro-5-chloromethyl-3,4-dimethyl-pyridazine was disolved with 0.87 g. of pyridine in 10 ml. of nitromethane, heated to 50° C. and held at that temperature for 15 hours. The reaction mixture was then cooled to −10° C. The hygroscopic 1-[6-chloro-3,4-dimethyl-pyridazinyl-(5)]-methyl-pyridiniuim chloride which precipitated was washed with a little cold nitromethane and ether. After recrystallization from nitromethane with the addition of Norit, the compound melted at 144° C. (dec.).

The 6 - chloro-5-chloromethyl-3,4-dimethyl-pyridazine employed as starting material was prepared as follows:

14.91 g. of 5-cyano-3,4-dimethyl-pyridazone-(6) was dissolved in 200 ml. of methanol and 100 ml. of 1 N hydrochloric acid and, after the addition of 0.75 g. of 5% palladium/charcoal, hydrogenated under normal conditions. After the uptake of 4.5 l. of hydrogen, the catalyst was filtered off. The filtrate was evaporated under reduced pressure at 40° C. The 6-chloro-5-aminomethyl-3,4-dimethyl-pyridazine hydrochloride which remained behind melted at 281–282° C. (dec.) after recrystallization from water/ethanol 1:9.

A solution of 6.9 g. of sodium nitrite in 50 ml. of water was dropped with stirring within 15 minutes into a solution of 19.0 g. of 6-hydroxy-5-aminomethyl-3,4-dimethyl-pyridazine hydrochloride in 100 ml. of water and 8.54 ml. of glacial acetic acid which was cooled to 0°. The clear solution was further stirred for 45 minutes at 0–5° C. and thereafter heated to 90° C. within 15 minutes. The solution was subsequently concentrated to about 30 ml. under reduced pressure and cooled to 0°. The white 6-hydroxy-5-hydroxymethyl-3,4-dimethyl-pyridazine which crystallized out melted at 208–210° C. (dec.) after recrystallization from isopropanol.

15.4 g. of 6-hydroxy - 5-hydroxymethyl-3,4-dimethyl-pyridazine was added to a solution of 20.8 g. of phosphorous pentachloride in 100 ml. of phosphorous oxychloride. The reaction mixture was heated to 90°. The excess phosphorous oxychloride was distilled off under reduced pressure after 1 hour. The residue was thoroughly stirred with ice and the resulting aqueous solution adjusted to pH 5 and extracted three times with ether. The combined ether extracts were purified with Norit and filtered. The yellow-brown colored filtrate was evaporated to dryness. The 6-chloro-5-chloromethyl-3,4-dimethyl-pyridazine which remained behind was recrystallized from methanol. The compound which precipitated crystalline at −20° C. melted at 90–92° C. (dec.)

EXAMPLE 4

1.91 g. of 6-chloro-5-chloromethyl-3,4-dimethyl-pyridazine was dissolved with 0.87 g. of pyridine in 10 ml. of nitromethane, heated to 50° C. and held at that temperature for 15 hours. The reaction mixture was then cooled to −10° C. and the crude pyridinum salt which precipitated was separated, washed with a small amount of cold nitromethane and ether, dissolved in 10 ml. of water and treated with 10 ml. of a 10% perchloric acid solution. The 1-{[6-chloro-3,4-dimethyl-pyridazinyl-(5)]-methyl}-pyridinium perchlorate product melted at 222° C. after recrystallization from water with the addition of Norit.

EXAMPLE 5

3.82 g. of 6-chloro-5-chloromethyl-3,4-dimethyl-pyridazine was heated to 55° C. with 2.05 g. of 2-methylpyridine and 15 ml. of nitromethane. The strongly red-colored solution was held at that temperature for 15 hours and subsequently cooled to −10° C. The 1-{[6-chloro - 3,4-dimethyl-pyridazinyl - (5)]-methyl}2-picolinium chloride which precipitated crystalline melted at 158° C. (dec.) after recrystallization from nitromethane.

EXAMPLE 6

1.91 g. of 6-chloro-5-chloromethyl-3,4-dimethyl-pyridazine was heated to 50° C. with 1.46 g. of 5,6,7,8-tetrahydroisoquinoline and 10 ml. of nitromethane, held at this temperature for 15 hours and subsequently cooled to −10° C. The hygroscopic 1-{[6-chloro-3,4-dimethyl-pyridazinyl - (5)]-methyl} - 5,6,7,8-tetrahydroisoquinolinium chloride which precipitated crystalline after prewashing with a little cold nitromethane and ether and crystallization from nitromethane melted at 173° C. (dec.).

EXAMPLE 7

1.91 g. of 6-chloro-5-chloromethyl-3,4-dimethyl-pyridazine was heated to 50° C. with 1.20 g. of 4-methoxy-pyridine and 10 ml. of nitromethane. The resulting dark colored solution was held at 50° C. for 15 hours, then cooled and evaporated to dryness under reduced pressure. The crystalline 1-{[6-chloro - 3,4-dimethyl-pyridazinyl-(5)]-methyl}-4-methoxy-pyridinium chloride which remained behind was taken up in cold acetonitrile and nitromethane and subsequently recrystallized twice from nitromethane. The compound melted at 168° C. (dec.).

EXAMPLE 8

0.95 g. of 6-chloro-5-chloromethyl-3,4-dimethyl-pyridazine was dissolved in 10 ml. of nitromethane and, following the addition of 0.88 g. of dry powdered potassium iodide, heated to 40° C. After 45 minutes, the reaction mixture was cooled to 10° C. The potassium chloride which precipitated was filtered off and washed with 2 ml. of nitromethane. The filtrate was treated with 0.67 g. of 4-acetyl-pyridine, heated to 50° C. and held at this temperature for 15 hours. The reaction solution was subsequently cooled and evaporated to dryness. The black residue was triturated with ether, filtered off by suction, dissolved in a mixture consisting of 2 ml. of acetonitrile and 18 ml. of water, shaken with Norit and filtered clear. The 1-{[6-chloro-3,4-dimethyl-pyridazinyl-(5)]-methyl}-4-acetylpyridinium iodide which precipitated on evaporation of the yellow solution melted at 151° C. (dec.) after recrystallization from methanol.

EXAMPLE 9

0.95 g. of 6-chloro-5-chloromethyl-3,4-dimethyl-pyridazine was dissolved in 10 ml. of nitromethane and, after the addition of 0.88 g. of dry powdered potassium iodide, heated to 40° C. After 45 minutes, the reaction mixture was cooled to +10° C. and the potassium chloride which precipitated was filtered off and washed with 2 ml. of nitromethane. The filtrate was treated with 0.71 g. of quinoline, heated to 60° C., held at that temperature for 3 hours and subsequetnly evaporated to dryness under reduced pressure. The residue was dissolved in water and the solution extracted with ether. The ether extract was shaken with Norit, filtered and evaporated to dryness. The 1-{[6-chloro-3,4-dimethyl-pyridazinyl-(5)]-methyl}-quinolinium iodide which remained behind melted at 162° C. (dec.) after recrystallization from methanol.

EXAMPLE 10

0.4 g. of 6-methoxy-5-chloromethyl-3,4-dimethylpyridazine was added to 2 ml. of 2-picoline and heated for 5 hours at 50°. After cooling the crystalline precipitate was filtered off and recrystallized twice from isopropanol. The 1-{[6-methoxy - 3,4-dimethylpyridazinyl-(5)]-methyl}-2-picolinium chloride product so obtained melted at 197° with decomposition.

The 6-methyl-5-chloromethyl - 3,4-dimethylpyridazine employed as starting material was prepared as follows:

1.48 g. of 5-cyano-6-methoxy-3,4-dimethylpyridazine was dissolved in 100 ml. of methanol and 10 ml. of 1 N HCl and hydrogenated with 0.2 g. of palladium/carbon. The catalyst was removed from the solution by filtration and the solution was evaporated in vacuo. The residue was recrystallized from isopropanol/water. The 6-methoxy-5-aminomethyl-3,4-dimethylpyridazine hydrochloride thus obtained melted at 212° with decomposition.

1.63 g. of 6-methoxy-5-aminomethyl-3,4-dimethylpyridazine hydrochloride was dissolved in 45 ml. of water and added to 0.69 ml. of glacial acetic acid. After cooling to 0°, a solution of 0.55 g. of sodium nitrite in 10 ml. of water was added dropwise. The mixture was warmed to 20° and the solution was then evaporated in vacuo and completely dried. The residue was mixed with 20 ml. of phosphorous oxychloride and warmed for 1 hour at 70° under stirring. The excess phosphorous oxychloride was evaporated in vacuo and the residue was washed and extracted twice with absolute benzene. The residue was treated with sodium carbonate to pH 5 and extracted with ether. The ether solution was treated with charcoal, filtered, dried over sodium sulfate and subsequently evaporated in vacuo. The 6-methoxy-5-chloromethyl-3,4-dimethylpyridazine product recrystallized from isopropyl ether melted at 98° with decomposition.

EXAMPLE 11

A poultry feed consisting of:

|  | Kg. |
|---|---|
| Maize meal | 24.040 |
| Soya bean oil cake | 19.051 |
| Mineral phosphate (defluorinated) | 1.405 |
| Limestone | 0.680 |
| Mineral salt | 0.227 |
| Manganese dioxide | 0.0077 |
| Methionine | 0.0454 |
| Vitamin premix | 0.35 |
|  | 45.8 |

This premix contains per pound:

| | | |
|---|---|---|
| Vitamin D | I.U. | 300,000 |
| Vitamin A | I.U. USP | 1,600,000 |
| Riboflavin | mg. | 600 |
| Calcium pantothenate | do. | 800 |
| Choline chloride | do. | 70 |
| Niacin | g. | 2.0 |
| Vitamin $B_{12}$ | mg. | 1.2 | was homogeneously mixed with 0.0125 wt. percent of 1-{[6-chloro-3-methyl-pyridazinyl-(5)]-methyl}-2-picolinium chloride and fed to a group of 20 chickens. Seven days after beginning the administration of this feed, each animal was artificially infected with about 100,000 sporulated oöcysts of *Eimeria tenella*. During the following 7 days, the experimental animals remained healthy and put on weight. Of 20 control animals which had been fed with the same feed without coccidiostatic active material, 13 animals perished within 7 days after the oöcyst infection.

What is claimed is:

1. A compound of the formula:

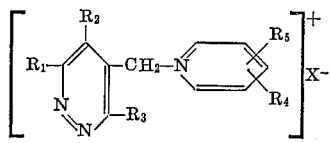

wherein $R_1$ and $R_2$ are each independently selected from the group consisting of hydrogen and lower alkyl; $R_3$ represents hydrogen, halogen, amino or lower alkoxy; $R_4$ and $R_5$ are each independently selected from the group consisting of hydrogen, lower alkyl, hydroxy-lower alkyl, lower alkanoyl, lower alkyl substituted benzoyl, benzoyl and halo substituted benzoyl or taken together $R_4$ and $R_5$ together with the pyridyl moiety represent a fused ring or a lower alkyl substituted fused ring, wherein said fused ring is selected from the group consisting of a quinolyl, isopkinolyl, 5,6,7,8-tetrahydroquinolyl and 5,6,7,8-tetrahydroisoquinolyl, and X represents the anionic moiety of a non-toxic acid.

2. A compound according to claim 1 wherein $R_1$ is methyl, $R_2$ is hydrogen, $R_3$ is chloro, $R_4$ is methyl and is in o-position, $R_5$ is hydrogen and X is chloride, i.e., the compound 1-{[6 - chloro - 3 - methyl - pyridazinyl - (5)]-methyl}-2-picolinium chloride.

3. A compound according to claim 1 wherein $R_1$ is methyl, $R_2$ is hydrogen, $R_3$ is chloro and $R_4$ and $R_5$ together with the pyridyl moiety to which they are attached form a 5,6,7,8-tetrahydroisoquinolyl group and X is chloride, i.e., the compound 1-{[6-chloro-3-methyl-pyridazinyl-(5)]-methyl} - 5,6,7,8 - tetrahydroisoquinolinium chloride.

4. A compound according to claim 1 wherein $R_1$ and $R_2$ are each methyl, $R_3$ is chloro, $R_4$ and $R_5$ are each hydrogen and X is chloride, i.e., the compound 1-{[6-chloro-3,4-dimethyl-pyridazinyl-(5)]-methyl} - pyridinium chloride.

5. A compound according to claim 1 wherein $R_1$ and $R_2$ are each methyl, $R_3$ is chloro, $R_4$ is hydrogen, $R_5$ is hydrogen and is in o-position and X is chloride, i.e., the compound 1-{[6-chloro-3,4 - dimethyl - pyridazinyl - (5)]-methyl}-2-picolinium chloride.

6. A compound according to claim 1 wherein $R_1$ and $R_2$ are each methyl, $R_3$ is chloro, $R_4$ is methoxy and is in p-position, $R_5$ is hydrogen and X is chloride, i.e., the compound 1-{[6-chloro-3,4-dimethyl-pyridazinyl-(6)] - methyl}-4-methoxy-pyridinium chloride.

7. A compound according to claim 1 wherein $R_1$ and $R_2$ are each methyl, $R_3$ is chloro, $R_4$ is acetyl and is in p-position, $R_5$ is hydrogen and X is iodide, i.e., the compound 1-{[6-chloro-3,4-dimethyl-pyridazinyl-(5)] - methyl}-4-acetyl pyridinium iodide.

8. A compound according to claim 1 wherein $R_1$ and $R_2$ are each methyl, $R_3$ is chloro, $R_4$ and $R_5$ taken together with the pyridyl moiety to which they are attached form a quinolyl group and X is iodide, i.e., the compound 1-{[6-chloro - 3,4 - dimethyl - pyridazinyl - (5)] - methyl}-quinolinium iodide.

9. A compound according to claim 1 wherein $R_1$ and $R_2$ are each methyl, $R_3$ is chloro, $R_4$ and $R_5$ taken together with the pyridyl moiety to which they are attached represent a 5,6,7,8-tetrahydroisoquinolyl group and X is chloride, i.e., the compound 1-{[6-chloro-3,4-dimethyl-pyridazinyl-(5)]-methyl}-5,6,7,8-tetrahydroisoquinolinium chloride.

10. A compound according to claim 1 wherein $R_1$ and $R_2$ are each methyl, $R_3$ is methoxy, $R_4$ is methyl and is in o-position, $R_5$ is hydrogen and X is chloride, i.e., the compound 1-{[6-methoxy-3,4-dimethyl-pyridazinyl-(5)]-methyl}-2-picolinium chloride.

References Cited

Shaw in "Pyridine and Derivatives", 1961—Interscience, pp. 2–3.

Mosher in "Heterocyclic Compounds," vol. 1, Elderfield, 1950, p. 414.

ALEX MAZEL, *Primary Examiner.*

R. V. RUSH, *Assistant Examiner.*

U.S. Cl. X.R.

424—250

PO-1050
(5/69)

UNITED STATES PATENT OFFICE
CERTIFICATE OF CORRECTION

Patent No. 3,453,277          Dated April 16, 1970

Inventor(s) Ramuz et al.

It is certified that error appears in the above-identified patent and that said Letters Patent are hereby corrected as shown below:

Claim 1, Column 9, Line 31 "isopkinolyl" should be isoquinolyl

SIGNED AND
SEALED
JUL 14 1970

(SEAL)
Attest:

Edward M. Fletcher, Jr.
Attesting Officer

WILLIAM E. SCHUYLER, JR.
Commissioner of Patents